United States Patent
Moussaoui (10) Patent No.: US 7,889,525 B2
(45) Date of Patent: Feb. 15, 2011

(54) SYSTEM AND METHOD FOR PHASE DROPPING AND ADDING

(75) Inventor: Zaki Moussaoui, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/730,372

(22) Filed: Mar. 24, 2010

(65) Prior Publication Data
US 2010/0244799 A1  Sep. 30, 2010

Related U.S. Application Data

(60) Provisional application No. 61/163,409, filed on Mar. 25, 2009.

(51) Int. Cl.
*H02M 7/00* (2006.01)
*G05F 1/44* (2006.01)

(52) U.S. Cl. .............. 363/65; 363/71; 363/72; 363/73; 363/74; 323/268; 323/271

(58) Field of Classification Search .......... 363/65, 363/71–74; 323/268, 271, 272
See application file for complete search history.

(56) References Cited

U.S. PATENT DOCUMENTS

| | | | |
|---|---|---|---|
| 6,285,571 B1 * | 9/2001 | Brooks et al. | 363/65 |
| 6,292,378 B1 * | 9/2001 | Brooks et al. | 363/65 |
| 2006/0083039 A1 * | 4/2006 | Oliveira et al. | 363/131 |
| 2006/0239046 A1 * | 10/2006 | Zane et al. | 363/65 |
| 2009/0224732 A1 * | 9/2009 | Kudo et al. | 323/271 |
| 2009/0230899 A1 * | 9/2009 | Arimura et al. | 318/400.01 |

* cited by examiner

*Primary Examiner*—Bao Q Vu
(74) *Attorney, Agent, or Firm*—Fogg & Powers LLC (57) ABSTRACT

A multi-phase voltage regulator comprises a plurality of current supplying stages, each current supplying stage configured to supply a local output current equaling at least a portion of a load current output from the multi-phase voltage regulator; and a plurality of control circuits, each control circuit coupled to a respective one of the plurality of current supplying stages, wherein each control circuit calculates a control signal based, at least in part, on a sampled current representative of the respective local output current and a sampled current representative of a master output current. The control signal from each control circuit causes the respective current supplying stage to be disabled gradually over a first time interval if the sum of the local output current and the master output current is detected as being below a respective first predetermined level.

32 Claims, 8 Drawing Sheets

SYSTEM AND METHOD FOR PHASE DROPPING AND ADDING

CROSS-REFERENCE TO RELATED APPLICATIONS

This application is related to U.S. provisional patent application Ser. No. 61/163,409 entitled "GANGABLE IC/MODULE PHASE DROPPING AND ADDING," filed on Mar. 25, 2009 and referred to herein as the '409 application. The present application hereby claims priority to U.S. Provisional Patent Application No. 61/163,409. The '409 application is hereby incorporated herein by reference.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Figure 1:
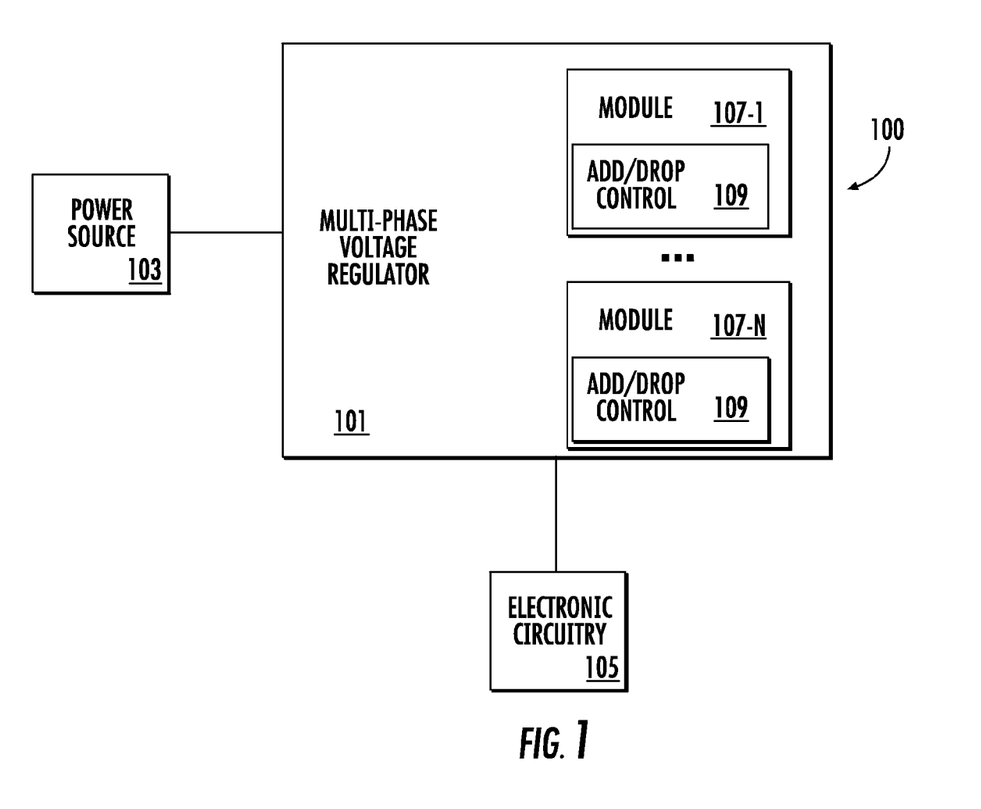
FIG. 1 is a block diagram of one embodiment of a system.

FIG. 1 is a block diagram of one embodiment of a system 100 utilizing a multi-phase voltage regulator 101. The system 100 also includes a power source 103 and a load 105. The load 105 draws power from the power source 103 via the variable phase voltage regulator 101. For example, the load 105 can be implemented as, but is not limited to, one or more of a processor (e.g. a microprocessor, digital signal processor, embedded processor, etc.), a display device (e.g. a light-emitting diode or LED display, a cathode ray tube or CRT display, a liquid crystal display or LCD, etc.), a memory device (e.g. conventional hard disk, Electrically Erasable Programmable ROM or EEPROM, flash memory, etc.), or other applicable peripheral devices, as known to one of skill in the art. Additionally, the power source 103 can be implemented as, but is not limited to, a conventional Alternating Current (AC) to Direct Current (DC) power supply or battery.

The multi-phase voltage regulator 101 is implemented as a switched-mode voltage regulator, such as a buck-mode voltage regulator, or a boost-mode voltage regulator. The multi-phase voltage regulator 101 includes a plurality of phases 107-1 . . . 107-N. The phases 107-1 . . . 107-N are ganged together to share the load current drawn by the load 105 and to regulate the voltage output from the multi-phase voltage regulator 101. Each phase 107 also includes add/drop control circuit 109. Each add/drop control 109 is operable to drop or disable the corresponding phase 107 gradually or incrementally when conditions indicate that the phase is to be dropped. For example, in order to increase efficiency under light load conditions, one or more phases can be dropped. Dropping a phase is also referred to herein as disabling or turning off the phase. In addition, in this embodiment, a phase is dropped substantially linearly. Dropping the phase gradually enables time for the remaining phases to adjust their corresponding output current to compensate for the phase drop. As a result, the effect on the remaining phases of the voltage or current drop caused by the phase transition is reduced.

In addition, when a phase is to be added to compensate for increased load demand, each add/drop control 109 is operable to add the corresponding phase approximately instantly. The fast response in adding a phase, as needed, helps provide fast transient response.

Figure 2:
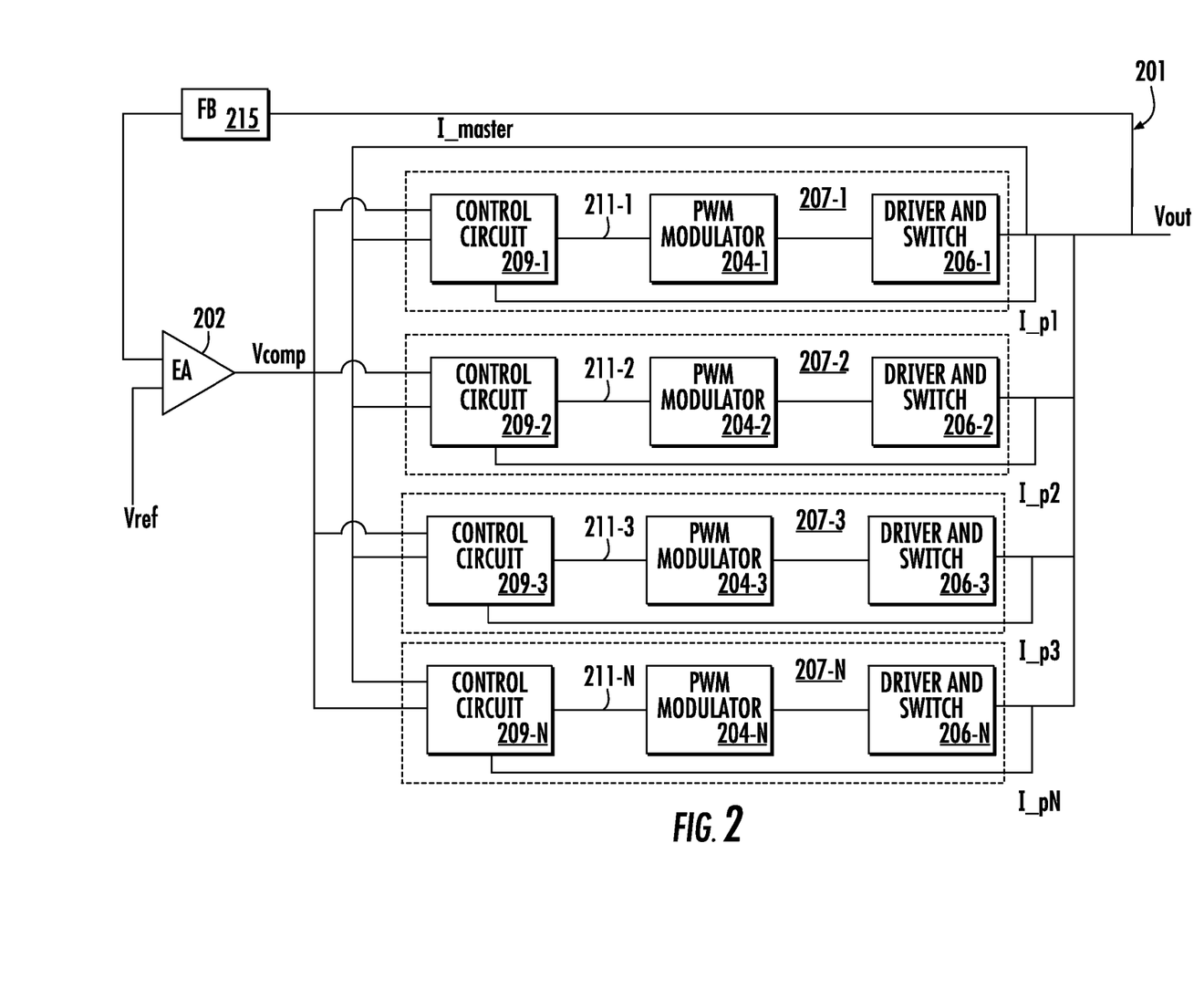
FIG. 2 is a block diagram of one embodiment of a multi-phase voltage regulator.

FIG. 2 is a block diagram of an exemplary voltage regulator 201 implementing phases 207-1 . . . 207-N. As shown in FIG. 2, each phase 207 includes a respective control circuit 209, a respective pulse width modulator 204, and a respective driver and switch circuit 206. Each driver and switch circuit 206 is responsive to a control signal from the respective PWM modulator 204 to regulate an output voltage. For example, in some embodiments, each driver and switch circuit 206 uses a driver that controls the turn-on and turn-off of a pair of electronic power switching devices based on the received PWM signal to regulate the output voltage.

The voltage regulator 201 includes a feedback network 215 which provides a signal representative of the voltage output, Vout, to an error amplifier 202. The error amplifier 202 compares the output voltage to a reference voltage to produce an error or compensation signal, Comp. The error signal is then provided to each of the control circuits 209-1 . . . 209-N.

In addition, each control circuit 209 receives an input representative of the output current of a master module, referred to in the drawings as I_master. Thus, each phase 207 monitors he master output current to share the total load current drawn by the load attached to the voltage regulator 201. Each control circuit 209 also receives an input representative of the respective phase's local output current. For example, control circuit 209-1 receives an input representative of its respective local output current I_p1 and control circuit 209-2 receives an input representative of its respective output current I_p2. Each control circuit 209 outputs a signal 211 to the respective PWM modulator 204 based on the received error signal, master output current and its respective local output current. The local output current from each phase provides at least a portion of the total load current drawn by the load. The control signal 211 output from the control circuit 209 adjusts the duty cycle of the respective PWM modulator 204.

Each of the phases 207-1 . . . 207-N is configured to drop out or be disabled when a predetermined condition is met. However, the master phase is configured such that it is always active and never disabled. The master phase in this example is phase 207-1. For example, each of the phases 207-2 ... 207-N is programmed, in some implementations, to be dropped when the combined total of the master output current and the respective local output current drops below a respective predetermined level for that phase. Similarly, in some embodiments, the master phase 207-1 is configured to be always active by setting the predetermined level to zero for phase 207-1 such that combined output current total for the master phase 207-1 does not drop below the predetermined level.

As described above, each control circuit 209 causes its respective phase 207 to gradually drop out to enable time for the remaining active phases to adjust the duty cycle of the respective PWM modulator 204 in order to compensate for the phase drop. In addition, as described above, each control circuit 209 also causes a substantially instant addition of its respective phase to the voltage regulator 201 when a predetermined condition is met. For example, in some embodiments, each control circuit 209 causes its respective phase to be added when the master output current exceeds a predetermined level for the respective phase. In some embodiments, the predetermined level corresponding to a phase drop is different than the predetermined level corresponding to the phase addition. In particular, in some implementations, the predetermined level corresponding to a phase drop is lower than the predetermined level for phase addition. In addition, the predetermined levels for phase adding and phase dropping, in some embodiments, are different for each phase 207. In addition, in some embodiments, the master phase 207-1 is programmed such that the predetermined level for phase adding and the predetermined level for phase dropping are both set to zero such that the combined output current total is greater than the phase dropping level and the phase adding level.

Figure 3:
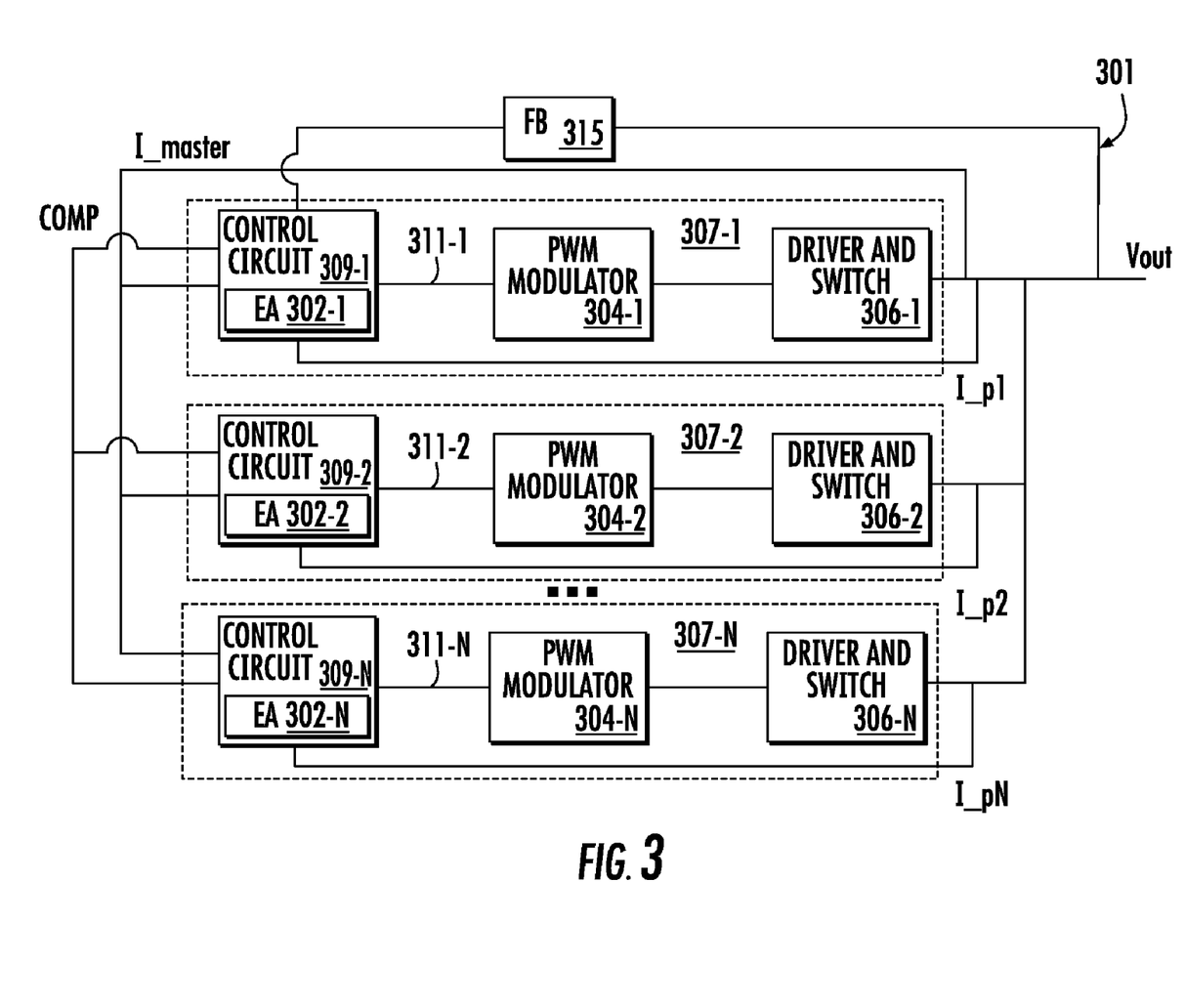
FIG. 3 is a block diagram of another embodiment of a multi-phase voltage regulator.

FIG. 3 is a block diagram of another embodiment of a multi-phase voltage regulator 301. In the voltage regulator 301, each phase 307 is implemented in an individual module. For example, each module can be placed on a separate integrated circuit which can be added and removed from the voltage regulator 301. As described above, each phase 307 includes a respective control circuit 309, a respective PWM modulator 304 and a respective driver and switch circuit 306. In addition, each control circuit 309 includes a respective error amplifier 302. Thus, the module of each phase 307 is substantially identical. However, only the error amplifier 302 in the master phase is enabled. In this example, the master phase is phase 307-1. Thus, the feedback network 315 is coupled to the master phase 307-1. The error amplifier 302-1 produces the compensation signal, Comp, as described above and distributes the compensation signal to each of the other phases 307-2 ... 307-N. The operation of voltage regulator 301 is similar to the voltage regulator 201 described above.

Figure 4:
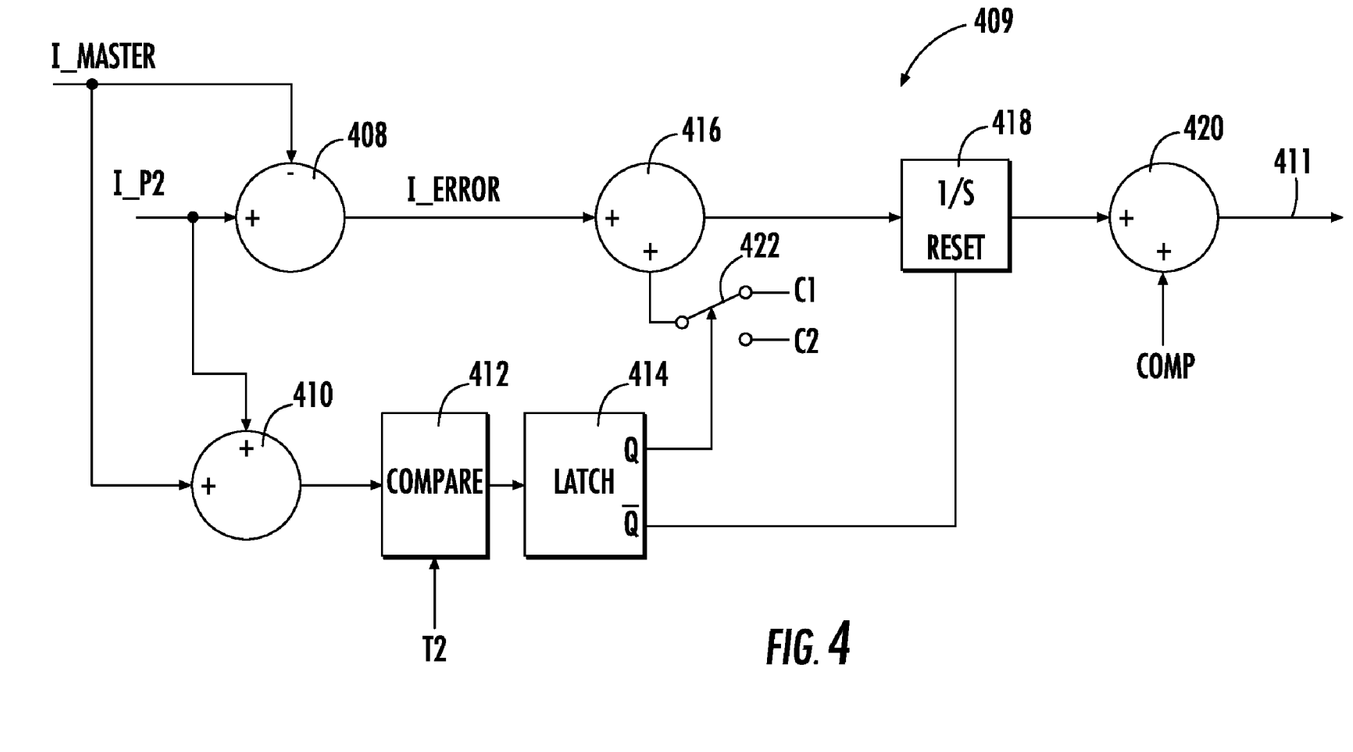
FIG. 4 is a block diagram of one embodiment of an exemplary control circuit.

A diagram of an exemplary control circuit 409 is shown in FIG. 4. The control circuit 409 can be implemented in each control circuit of voltage regulator 201 or 301. The control circuit 409 receives the master output current I_master, the respective local output current, I_P2 in this example, and the compensation signal, Comp. The master output current and local output current are summed in summation circuit 410 to produce a combined output current. In addition, a difference, I_error, between the master output current and local output current is calculated in difference circuit 408.

The combined output current is compared to a predetermined threshold value, T2, in comparator 412. The predetermined threshold value, T2, can be independently set for each module. For example, one module can be programmed with a threshold value corresponding to 15 amps whereas another module can be programmed with a threshold value corresponding to 10 amps, etc. In some implementations, the predetermined threshold value is set through digital logic from an internal control register. Alternatively, in other implementations, an external terminal is used to receive a signal which sets the threshold value. The internal programmability through an internal control register or the external programmability through an external terminal enables flexibility for the addition of more IC modules in accordance with the current requirements.

A signal based on the result of the comparison in comparator 412 is provided to latch circuit 414. If the combined output current is greater than the predetermined threshold value, the latch circuit 414 outputs a signal to switch 422 which causes the switch 422 to couple a first constant value, C1, to a summation circuit 416. Summation circuit 416 combines the difference signal, I_error, with the constant value C1. In this example, C1 is set to zero. Thus, when C1 is set to zero, summation circuit 416 outputs I_error as received from difference circuit 408.

An integrator 418 receives the signal output from the summation circuit 416. The integrator 418 integrates the output of the summation circuit 416. The output of the integrator 418 is then combined with the compensation signal, Comp, in the summation circuit 420. The output of the summation circuit 420 is then sent to the respective PWM modulator to control the duty cycle of the PWM modulator.

If the combined output current is less than the predetermined threshold value, the latch circuit 414 outputs a signal to switch 422 which causes the switch 422 to couple a second constant value, C2, to the summation circuit 416. The second constant value is added to the I_error signal. Thus, the second constant value provides an offset to the integrator 418 which causes the integrator 418 to accumulate a value which grows higher and higher. Hence, the output of integrator 418 grows higher and higher. Once the output of the summation circuit 420 grows higher than a ramp signal in the PWM modulator, the PWM modulator will be saturated and the duty cycle will go to 0. Thus, as the output of the integrator 418 grows, the local output current corresponding to the control circuit 409 grows smaller until it reaches zero. As described above, the corresponding driver and switch circuit includes two switches. Reducing the duty cycle to 0 causes one of the switches to be turned-off. The other switch is turned-off, in some embodiments, through a separate signal output from the control circuit 409.

As the local output current corresponding to control circuit 409 grows smaller, the remaining active phases will adjust their duty cycle based on the shared master output current to compensate for the dropped phase. The rate at which the local output current corresponding to the control circuit 409 decreases is based on the constant value, C2. Thus, the amount of time taken to drop the phase can be adjusted by adjusting the value of constant value C2.

After the phase has been dropped, the control circuit 409 continues to monitor the master output current to determine when the phase should be added. In particular, in this example, the combined output current is compared to the predetermined threshold value, T2. Since, the phase has been dropped, the local output current is zero and the combined output current is equal to the master output current. Although, the combined output current is compared to the predetermined threshold value, T2, in this example, it is to be understood that in other embodiments, a separate threshold value is used to determine when to add a phase.

If the master output current is greater than the predetermined threshold value, the latch 414 outputs a signal which causes the switch 422 to couple the constant value C1 to the summation circuit 416. Thus, the offset which is input into the integrator 418 is removed. In addition, the latch 414 outputs a signal to the integrator 418 which resets the integrator 418 to zero. As a result, the phase is added substantially instantly rather than gradually adding the phase by gradually decreasing the value in the integrator 418. In this way, the control circuit 409 responds quickly to increases in load current.

Figure 5:
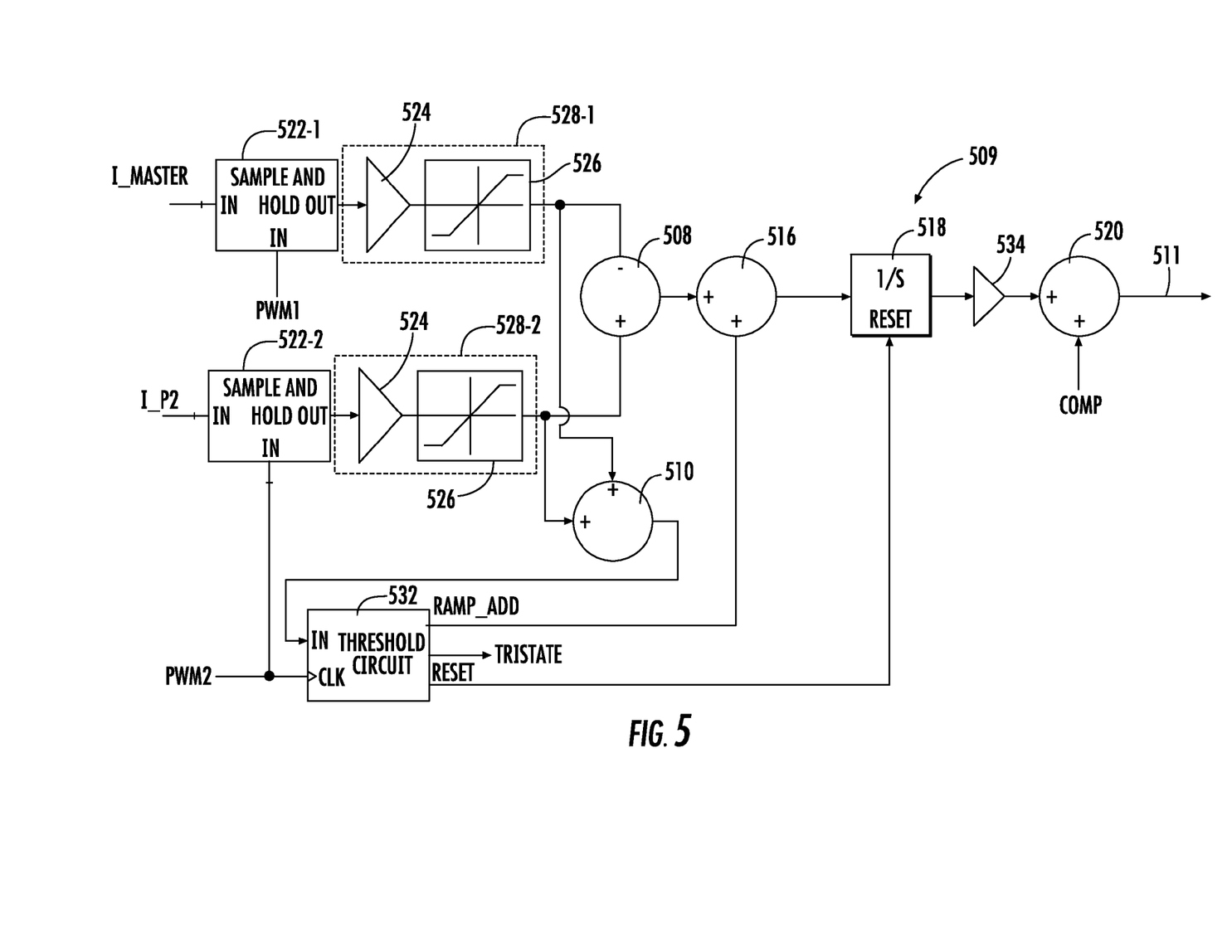
FIG. 5 is a block diagram of another embodiment of an exemplary control circuit.

FIG. 5 is a block diagram of another embodiment of a control circuit 509. Control circuit 509 includes a sample and hold circuit 522-1 which samples the I_master signal based on a clock signal PWM1. The clock signal PWM1 represents the PWM signal associated with the master phase. Control circuit 509 also includes a sample and hold circuit 522-2 which samples the I_P2 signal based on a clock signal PWM2. The I_P2 signal represents the local output current and the PWM2 signal represents the PWM signal associated with the respective phase in which the control circuit 509 is located.

The output of the sample and hold circuits 522-1 and 522-2 are optionally passed through a respective amplification stage 528-1 and 528-2. Each amplification stage, in this example, includes an amplifier 524 and a saturation limiter 526. The saturation limiter 526 helps limit the current so that the sampled current doesn't go too high above a limit. For example, if there is noise in the system, the saturation limiter 526 prevents the noise from pushing the sampled current above a limit.

The sampled I_master and I_P2 signals are summed in the summation circuit 510 to produce a combined output current. In addition, a difference between the I_master and I_P2 signal is calculated in the difference circuit 508. In control circuit 509, the combined output current is received by threshold circuit 532 which uses the PWM2 signal as a clock signal. The threshold circuit 532 also includes circuitry to compare the combined output current to a predetermined threshold. If the combined output current drops below the predetermined threshold, the threshold circuit 532 outputs an offset, ramp_add, which is combined with the difference signal I_error in the summation circuit 516. The offset causes the integrator 518 to accumulate a value which grows higher and higher similar to the effect of the offset C2 in FIG. 4. The output of the integrator 518 is also optionally passed through an amplifier 534 prior to being input to the summation circuit 520 which combines the output of the integrator 518 with the compensation signal, Comp, as described above.

In addition, the threshold circuit 532 outputs a tri-state signal which causes the lower switch of the corresponding driver and switch circuit to open or remain turned off. The lower switch is maintained open by the tri-state signal. When open, the lower switch operates as a diode. Once the PWM duty cycle goes to zero, as described above, the upper switch will also be opened and the phase is dropped or turned off.

When the combined output current again rises above the same or a different predetermined threshold level, the threshold circuit 532 outputs a reset signal to reset the integrator to zero. In addition, the threshold circuit 532 does not continue to output the offset, ramp_add, and the corresponding driver and switch circuit is no longer placed in tri-state mode (e.g. both switches open). Thus, the phase is added substantially instantly to react quickly to rising load current.

Figure 6A:
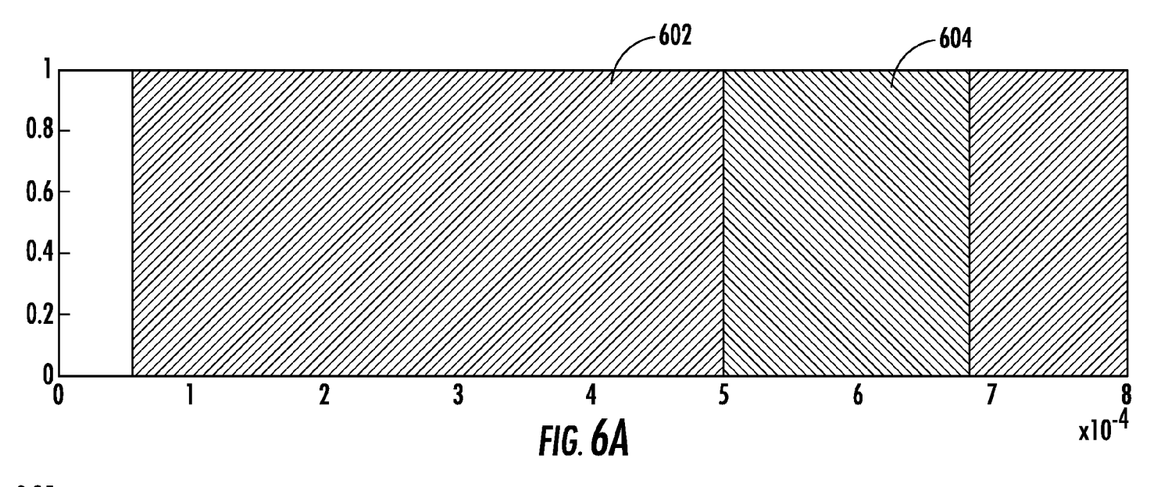
FIG. 6A is a graph depicting exemplary PWM signals of two modules.

FIG. 6A is a graph depicting exemplary PWM signals of two phases. The horizontal axis represents time in milliseconds. The vertical axis represents the switching of the PWM signals between the logical values of 1 and 0. Thus, the region 602 represents a period of time when the PWM modulator of both the master phase and a second phase are switching. The region 604 corresponds to a period of time when the PWM duty cycle of the second phase is at zero and only the PWM modulator of the master phase is switching. In other words, during the region 604, the master phase carries the entire load current as shown in FIG. 6B which depicts exemplary currents associated with the two phases in FIG. 6A.

Figure 6B:
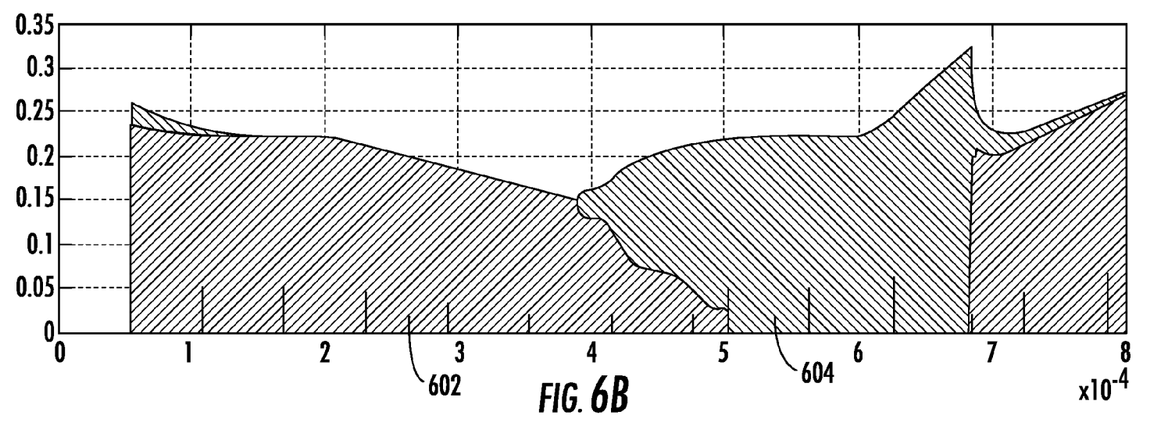
FIG. 6B is a graph depicting exemplary currents associated with the two modules in FIG. 6A.

As shown in FIG. 6B, once the combined output current in this example reached approximately 0.15 amps, the second phase began to be dropped or disabled. In particular, the phase was gradually dropped as described above. As shown in this example, the drop is approximately a linear drop of the phase as the current carried by the second phase gradually decreases until it reaches zero. Also, as shown in the example of FIG. 6B, the current carried by the master phase gradually increases to compensate for the decrease in current carried by the second phase. Thus, the master phase has time to adjust for the dropped phase. As a result, a voltage drop in the regulated output voltage due to the phase transition can be maintained within desired tolerances.

In addition, once the load current carried by the master phase reaches approximately 0.3 amps in the example of FIG. 6B, the second phase adds its corresponding phase. As shown in FIG. 6B, the phase is added substantially instantly and the current carried by the master current drops quickly as the phases of both phases begin sharing the load current. The control circuit described above also helps maintain voltage fluctuations due to the added phase within desired tolerances, due in part to the ability to add the phase quickly.

Figure 7:
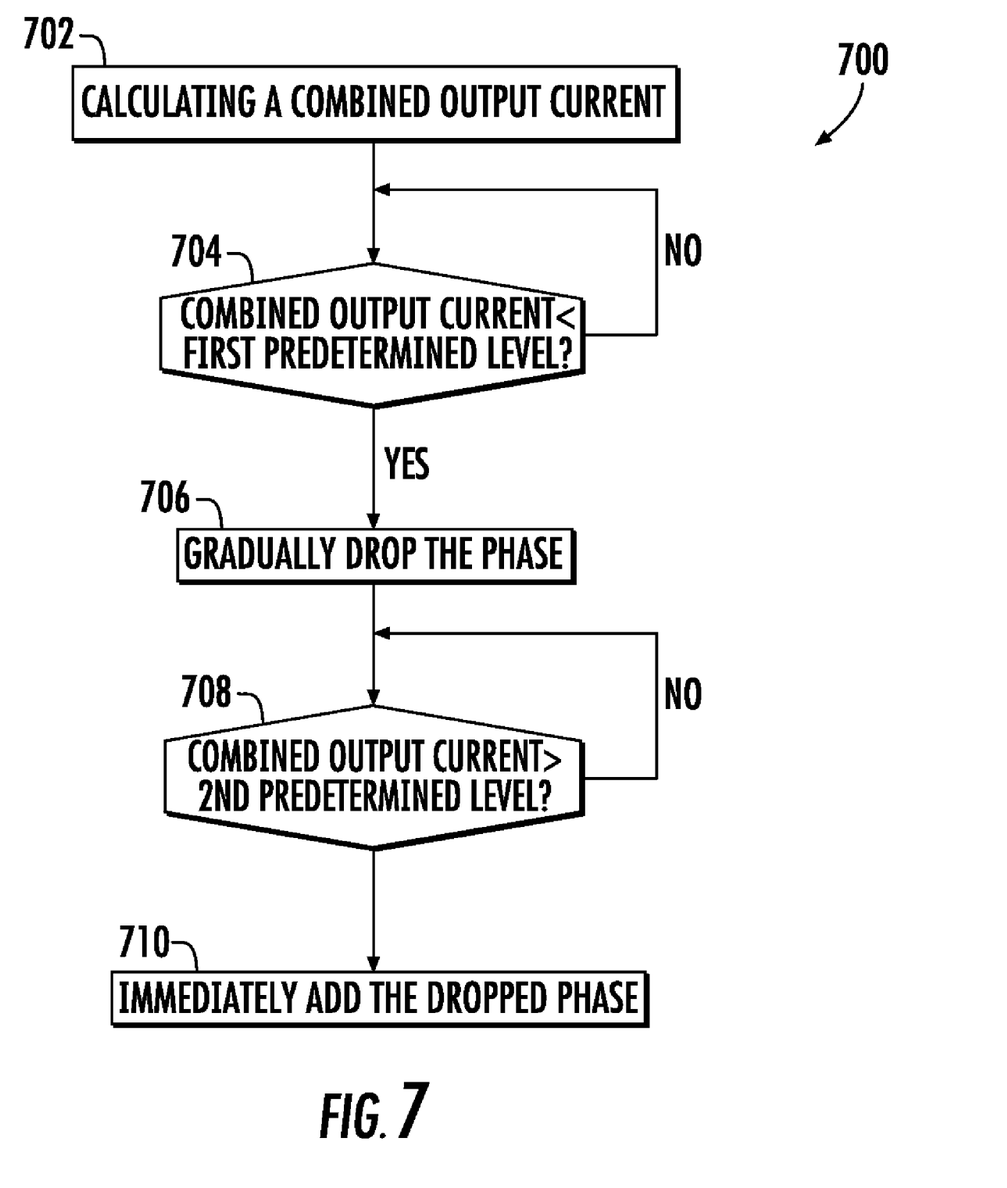
FIG. 7 is a flow chart depicting one embodiment of a method of managing phase transitions in a module of a voltage regulator having a plurality of modules.

FIG. 7 is a flow chart depicting a method 700 of managing phase transitions in a voltage regulator having a plurality of phases, such as voltage regulator 201. Method 700 is performed for each phase in the voltage regulator. At block 702, a combined output current is calculated. The combined output current is the sum of a master output current representative of the current output by a master phase and a local output current representative of the current output by the respective phase. At block 704, the combined output current is compared with a first predetermined level. If the combined output current is greater than the first predetermined level, the method 700 loops back to block 704 to continue monitoring the combined output current. If the combined output current is less than the first predetermined level, the respective phase is gradually dropped at block 706. One exemplary method of gradually dropping the phase is described with respect to FIG. 8.

After gradually dropping the phase, the combined output current is compared to a second predetermined level at block 708. In some embodiments, the first predetermined level is different than the second predetermined level. In particular, in some embodiments, the first predetermined level is lower than the second predetermined level. If the combined output current is less than the second predetermined level, the method 700 loops back to block 708 to continue monitoring the combined output current. If the combined output current is greater than the second predetermined level, the dropped phase is immediately added at block 710. For example, in some embodiments, the phase is immediately added by resetting an integrator and removing an offset value provided to the integrator as described above.

Figure 8:
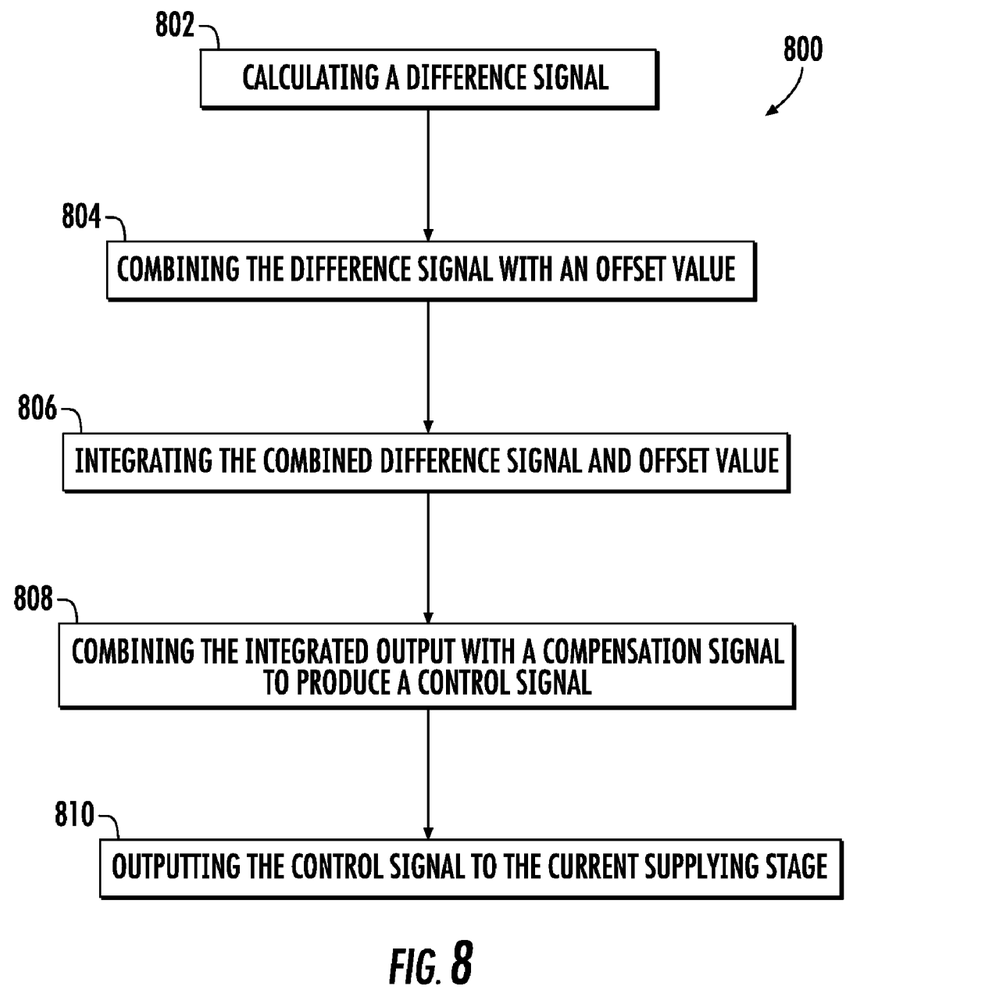
FIG. 8 is a flow chart depicting one embodiment of a method of gradually dropping a phase.

FIG. 8 is a flow chart depicting one embodiment of a method of gradually dropping a phase. At block 802, a difference signal representative of a difference between the master output current and the local output current is calculated. At block 804, the difference signal is combined with an offset value. At block 806, the combined difference signal and offset value are integrated to produce an integrated output. The offset value causes the integrated output to grow gradually. At block 808, the integrated output is combined with a compensation signal to produce a control signal. The compensation signal is representative of a difference between an output voltage of the voltage regulator and a reference voltage. At block 810, the control signal is output to the respective PWM modulator of the current supplying stage. The current supplying stage includes the PWM modulator and the driver and switch circuit. As the integrated output grows, the control signal will also grow causing the respective phase to reduce the portion of the load current carried by the respective phase until the load current carried by the respective phase is reduced to zero.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A multi-phase voltage regulator comprising:
a plurality of current supplying stages, each current supplying stage configured to supply a local output current equaling at least a portion of a load current output from the multi-phase voltage regulator; and
a plurality of control circuits, each control circuit coupled to a respective one of the plurality of current supplying stages, wherein each control circuit calculates a control signal based, at least in part, on a sampled current representative of the respective local output current and a sampled current representative of a master output current;
wherein the control signal from each control circuit causes the respective current supplying stage to be disabled gradually over a first time interval if the sum of the local output current and the master output current is detected as being below a respective first predetermined level.

2. The multi-phase voltage regulator of claim 1, wherein the control signal from each control circuit causes the respective current supplying stage to be enabled immediately if the sum of the local output current and the master output current is detected as being above a second respective predetermined level.

3. The multi-phase voltage regulator of claim 1, wherein the control signal from each control circuit causes the respective current supplying stage to be enabled immediately if the sum of the local output current and the master output current is detected as being above the respective first predetermined level.

4. The multi-phase voltage regulator of claim 1, wherein each of the plurality of current supplying stages comprises:
a pulse width modulation (PWM) circuit operable to generate a PWM signal; and
a driver and switch circuit operable to generate the respective local output current based on the PWM signal.

5. The multi-phase voltage regulator of claim 4, wherein the respective control circuit is configured to output a signal which causes a switching device in the driver and switch circuit to remain turned off.

6. The multi-phase voltage regulator of claim 1, wherein each of the plurality of control circuits comprises
a first summation circuit to calculate a combined output current representative of a sum of the master output current and the respective local output current;
a difference circuit to calculate a difference signal representative of a difference between the master output current and the respective local output current;
threshold circuitry to compare the combined output current with the first predetermined level;
a second summation circuit to sum the difference signal with a signal from the threshold circuitry;
an integrator to integrate an output of the second summation circuit; and
a third summation circuit to combine an output of the integrator with a compensation signal, an output of the third summation circuit controlling operation of the respective current supplying stage;
wherein, when the combined output current is below the first predetermined level, the signal from the threshold circuitry has an offset value which causes the output of the integrator circuit to grow larger gradually until the output of the third summation circuit disables the respective current supplying stage.

7. The multi-phase voltage regulator of claim 6, wherein the first predetermined level is set by one of an internal control register in the threshold circuitry and an external signal received by the threshold circuitry.

8. The multi-phase voltage regulator of claim 6, wherein the threshold circuitry in each of the plurality of control circuits comprises:
a switch operable to couple the second summation circuit to one of a first constant value and a second constant value, wherein the second constant value is the offset value which causes the output of the integrator circuit to grow larger gradually;
a comparator circuit to compare the combined output current to the respective first predetermined level; and
a latch circuit coupled to the comparator circuit and operable to output a signal to the switch to cause the switch to couple the second summation circuit to the second constant value when the combined output current is below the respective first predetermined level.

9. A multi-phase voltage regulator comprising:
a master phase comprising:
an error amplifier to generate a compensation signal based on a difference between a reference voltage and a signal representative of a voltage at an output node of the multi-phase voltage regulator;
a current supplying stage to supply a master output current equaling at least a portion of a load current output from the multi-phase voltage regulator; and
a master control circuit to calculate a control signal based on the compensation signal and a sampled current representative of the master output current, wherein operation of the current supplying stage is controlled by the control signal; and
one or more additional phases, wherein each of the one or more additional phases comprises:
a current supplying stage to supply a respective local output current equaling at least a portion of the load current; and
a control circuit to calculate a control signal based on the compensation signal, a sampled current representative of the respective local output current, and a sampled current representative of the master output current;
wherein the control circuit is configured to disable the respective current supplying stage gradually based on a comparison of a respective first predetermined level with a sum of the respective local output current and the master output current.

10. The multi-phase voltage regulator of claim 9, wherein the control circuit in each of the one or more additional phases is further operable to enable the respective current supplying stage immediately based on a comparison of a second predetermined level with the sum of the respective local output current and the master output current.

11. The multi-phase voltage regulator of claim 9, wherein each of the master phase and the one or more additional phases is implemented as an individual module.

12. The multi-phase voltage regulator of claim 11, wherein each of the individual modules are substantially identical.

13. The multi-phase voltage regulator of claim 9, wherein the current supplying stage in each phase comprises:
   a pulse width modulation (PWM) circuit operable to generate a PWM signal; and
   a driver and switch circuit operable to generate the respective local output current based on the PWM signal.

14. The multi-phase voltage regulator of claim 13, wherein the control circuit of each of the one or more additional phases is configured to output a signal which causes a switching device in the respective driver and switch circuit to remain turned off.

15. The multi-phase voltage regulator of claim 9, wherein the control circuit in each of the one or more additional phases comprises:
   a first summation circuit to calculate a combined output current representative of a sum of the master output current and the respective local output current;
   a difference circuit to calculate a difference signal representative of a difference between the master output current and the respective local output current;
   threshold circuitry to compare the combined output current with the respective first predetermined level;
   a second summation circuit to sum the difference signal with a signal from the threshold circuitry;
   an integrator to integrate an output of the second summation circuit; and
   a third summation circuit to combine an output of the integrator with the compensation signal, an output of the third summation circuit controlling operation of the respective current supplying stage;
   wherein, when the combined output current is below the respective first predetermined level, the signal from the threshold circuitry has an offset value which causes the output of the integrator circuit to grow larger gradually until the output of the third summation circuit disables the respective current supplying stage.

16. The multi-phase voltage regulator of claim 15, wherein the respective first predetermined level in each of the one or more additional phases is set by one of an internal control register in the respective threshold circuitry and an external signal received at the respective threshold circuitry.

17. The multi-phase voltage regulator of claim 15, wherein the threshold circuitry in each of the one or more additional phases comprises:
   a switch operable to couple the second summation circuit to one of a first constant value and a second constant value, wherein the second constant value is the offset value which causes the output of the integrator circuit to grow larger gradually;
   a comparator circuit to compare the combined output current to the respective first predetermined level; and
   a latch circuit coupled to the comparator circuit and operable to output a signal to the switch to cause the switch to couple the second summation circuit to the second constant value when the combined output current is below the respective first predetermined level.

18. A system comprising:
   a power source to provide a voltage signal;
   a multi-phase voltage regulator having a plurality of phases and configured to regulate the voltage signal from the power source; and
   a load coupled to the multi-phase voltage regulator to receive the regulated voltage signal;
   wherein the multi-phase voltage regulator is further configured to gradually drop one of the plurality of phases based, at least in part, on the level of current output by the dropped phase; and
   wherein the multi-phase voltage regulator is further configured to immediately add the dropped phase based, at least in part, on the level of current output by one of the other phases.

19. The system of claim 18, wherein the multi-phase voltage regulator further comprises
   a master phase comprising:
      an error amplifier to generate a compensation signal based on a difference between a reference voltage and a signal representative of a voltage at an output node of the multi-phase voltage regulator;
      a current supplying stage to supply a master output current equaling at least a portion of a load current output from the multi-phase voltage regulator; and
      a master control circuit to calculate a control signal based on the compensation signal and a sampled current representative of the master output current, wherein operation of the current supplying stage is controlled by the control signal; and
   one or more additional phases, wherein each of the one or more additional phases comprises:
      a current supplying stage to supply a local output current equaling at least a portion of the load current; and
      a control circuit to calculate a control signal based on the compensation signal, a sampled current representative of the respective local output current, and a sampled current representative of the master output current;
      wherein the control circuit is configured to disable the respective current supplying stage gradually based on a comparison of a respective first predetermined level with a sum of the respective local output current and the master output current.

20. The system of claim 19, wherein the control circuit in each of the one or more additional phases is further operable to enable the respective current supplying stage immediately based on a comparison of a respective second predetermined level with the sum of the respective local output current and the master output current.

21. The system of claim 19, wherein each of the master phase and the one or more additional phases is implemented as an individual module.

22. The system of claim 19, wherein the current supplying stage in each phase comprises:
   a pulse width modulation (PWM) circuit operable to generate a PWM signal; and
   a driver and switch circuit operable to generate the respective local output current based on the PWM signal.

23. The system of claim 22, wherein the control circuit of each of the one or more additional phases is configured to output a signal which causes a switching device in the respective driver and switch circuit to remain turned off.

24. The system of claim 19, wherein the control circuit in each of the one or more additional phases comprises:

a first summation circuit to calculate a combined output current representative of a sum of the master output current and the respective local output current;

a difference circuit to calculate a difference signal representative of a difference between the master output current and the respective local output current;

threshold circuitry to compare the combined output current with the respective first predetermined level;

a second summation circuit to sum the difference signal with a signal from the threshold circuitry;

an integrator to integrate an output of the second summation circuit; and a third summation circuit to combine an output of the integrator with the compensation signal, an output of the third summation circuit controlling operation of the respective current supplying stage;

wherein, when the combined output current is below the respective first predetermined level, the signal from the threshold circuitry has an offset value which causes the output of the integrator circuit to grow larger gradually until the output of the third summation circuit disables the respective current supplying stage.

25. The system of claim 24, wherein the respective first predetermined level in each of the one or more additional phases is set by one of an internal control register in the respective threshold circuitry and an external signal received at the respective threshold circuitry.

26. The system of claim 24, wherein the threshold circuitry in each of the one or more additional phases comprises:
a switch operable to couple the second summation circuit to one of a first constant value and a second constant value, wherein the second constant value is the offset value which causes the output of the integrator circuit to grow larger gradually;
a comparator circuit to compare the combined output current to the respective first predetermined level; and
a latch circuit coupled to the comparator circuit and operable to output a signal to the switch to cause the switch to couple the second summation circuit to the second constant value when the combined output current is below the respective first predetermined level.

27. A control circuit for a phase in a multi-phase voltage regulator, the control circuit comprising:
a first summation circuit to calculate a combined output current representative of a sum of a master output current and a local output current of the respective phase;
a difference circuit to calculate a difference signal representative of a difference between the master output current and the local output current;
threshold circuitry to compare the combined output current with a first predetermined level;
a second summation circuit to sum the difference signal with a signal from the threshold circuitry; and
an integrator to integrate an output of the second summation circuit;
wherein, when the combined output current is below the first predetermined level, the signal from the threshold circuitry has an offset value which causes the output of the integrator circuit to grow larger gradually until the respective phase is disabled.

28. The control circuit of claim 27, wherein the first predetermined level is set by one of an internal control register in the threshold circuitry and an external signal received at the threshold circuitry.

29. The control circuit of claim 27, wherein the threshold circuitry comprises:
a switch operable to couple the second summation circuit to one of a first constant value and a second constant value, wherein the second constant value is the offset value which causes the output of the integrator circuit to grow larger gradually;
a comparator circuit to compare the combined output current to the first predetermined level; and
a latch circuit coupled to the comparator circuit and operable to output a signal to the switch to cause the switch to couple the second summation circuit to the second constant value when the combined output current is below the first predetermined level.

30. A method of managing phase transitions of a phase in a multi-phase voltage regulator, the method comprising:
calculating a combined output current by summing a master output current of a master phase with a local output current of the phase;
comparing the combined output current with a first predetermined level;
if the combined output current is less than the first predetermined level, gradually disabling the phase over a first period of time.

31. The method of claim 30, further comprising:
after gradually dropping the phase, comparing the combined output current with a second predetermined level; and
if the combined output current is greater than the second predetermined level, immediately enabling the dropped phase.

32. The method of claim 30, wherein gradually disabling the phase further comprises:
calculating a difference signal representative of a difference between the master output current and the local output current;
combining the difference signal with an offset value;
integrating the combined difference signal and offset value to produce an integrated output;
combining the integrated output with a compensation signal to produce a control signal, the compensation signal being representative of a difference between an output voltage of the multi-phase voltage regulator and a reference voltage;
wherein the offset value causes the integrated output to grow gradually until the control signal causes the respective phase to be disabled.

* * * * *